United States Patent [19]

Moss et al.

[11] Patent Number: 4,916,593
[45] Date of Patent: Apr. 10, 1990

[54] REMOTELY ILLUMINATED TRANSPARENT HOLOGRAPHIC STOPLIGHT FOR AUTOMOBILES

[75] Inventors: Gaylord E. Moss, Marina del Rey; John E. Wreede, Monrovia; Kevin Yu, Temple City; Ronald T. Smith, Redondo Beach, all of Calif.

[73] Assignee: Hughes Aircraft Company, Los Angeles, Calif.

[21] Appl. No.: 293,927

[22] Filed: Jan. 4, 1989

[51] Int. Cl.⁴ ............................................. B60Q 1/26
[52] U.S. Cl. .................................. 362/80.1; 340/479; 350/3.7; 350/3.85
[58] Field of Search ................ 362/61, 80.1, 253, 812; 340/479; 350/3.7, 3.85

[56] References Cited

U.S. PATENT DOCUMENTS

| | | | |
|---|---|---|---|
| 4,700,277 | 10/1987 | Moore | 340/479 X |
| 4,758,931 | 7/1988 | Gabaldon | 340/479 X |
| 4,790,613 | 12/1988 | Moss | 350/3.85 X |

Primary Examiner—Stephen F. Husar
Attorney, Agent, or Firm—Leonard A. Alkov; Wanda Denson-Low

[57] ABSTRACT

A holographic stoplight assembly including a volume hologram having a recorded stoplight image secured adjacent to the inside surface of an automobile window. The volume hologram is selectively illuminated by an illumination source located out of the driver's rearward field of vision and forward of the hologram. Also disclosed is a method for recording a hologram for use in a holographic automobile stoplight system which includes the steps of recording the image of a stoplight in a first hologram, and then recording in a second hologram the playback image of the first hologram.

5 Claims, 3 Drawing Sheets

REMOTELY ILLUMINATED TRANSPARENT HOLOGRAPHIC STOPLIGHT FOR AUTOMOBILES

BACKGROUND OF THE INVENTION

The disclosed invention relates generally to an automobile brake or stoplight known as a center high mounted stoplight which is mounted on the inside of an automobile rear window, and more particularly is directed to a holographic stoplight that can be mounted on the rear window without obscuring rearward visibility.

Present federal regulations require center high mounted stoplights in addition to the standard stoplights mounted in the rear portion of an automobile. The high mounted stoplights are intended to maximize the visibility of the automobile braking indicators to drivers following the braking vehicle, and are commonly mounted on the rear window of an automobile.

High mounted stoplights have commonly been implemented as a standard lenticular lens and an illuminating incandescent bulb enclosed in a housing that is typically secured adjacent the top or bottom of an automobile rear window. However, the bulky housing partially obscures the rearward vision of the driver, and moreover imposes limitations on the design of the automobile.

Center high mounted stoplights have been also integrated into automobile body parts such as rear decks, spoilers, roofs, which to some substantially reduce or remove the rearward vision problem. However, such toplights are complex and may impose limitations on the design of the automobile.

SUMMARY OF THE INVENTION

It would therefore be an advantage to provide a center high mounted stoplight which is at a rear window of an automobile and does not obscure the rearward vision of the driver.

The foregoing and other advantages are provided by the invention in a holographic automobile stoplight system comprising that includes a hologram having a recorded image of an automobile stoplight secured adjacent to an automobile rear window, and an illumination source located out of the driver's rearward field of view and forward of the hologram for illuminating the hologram which produces a holographic image of the recorded image that is visible from behind the automobile.

A further aspect of the invention is directed to a method for recording a hologram for use in a holographic automobile stoplight system which includes the steps of recording the image of a stoplight in a first hologram, and then recording in a second hologram the playback image of the first hologram.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION OF THE DISCLOSURE

Figure 1:
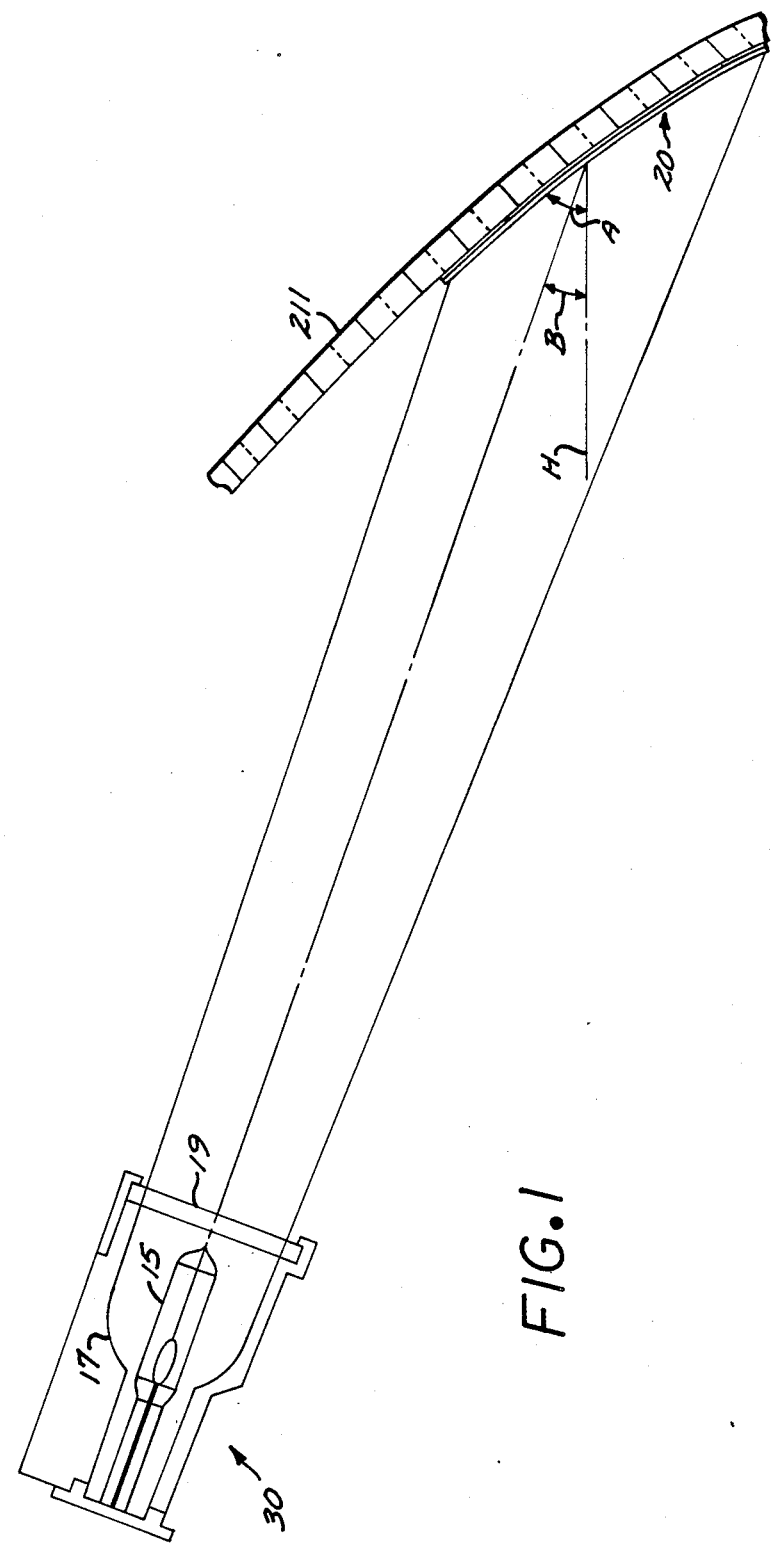
FIG. 1 is a schematic sectional view illustrating an installation of the disclosed holographic automobile stoplight system.

In the following detailed description and in the several figures of the drawing, like elements are identified with like reference numerals.

Referring now to FIG. 1, shown therein is a center high mounted stoplight system which includes a hologram assembly 20 and an illumination source 30. The hologram assembly 20, which includes a volume transmission hologram described further herein, is secured to the inside surface of an automobile rear window 211, and is substantially transparent to the rearward vision of the driver. The illumination source 30 is mounted forward of the hologram assembly 20 and out of the rearward viewing angle of the driver, for example adjacent the inside of the roof of the automobile, and illuminates the volume hologram of the hologram assembly 20 with a substantially or approximately collimated beam.

Figure 2:
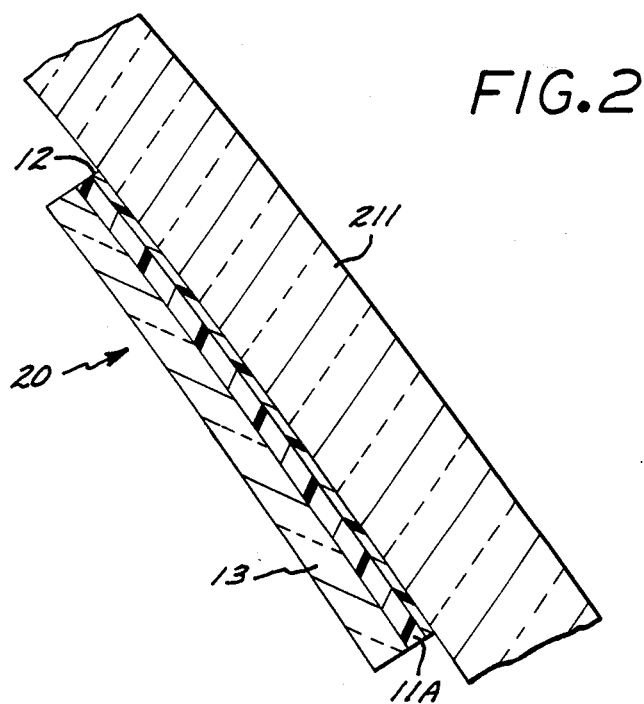
FIG. 2 is a detailed sectional view of the hologram assembly of the holographic stoplight system of FIG. 1.

Referring now to FIG. 2, the hologram assembly 20 comprises a volume hologram 11A that is secured to a thin glass substrate 13 such as is available from Dow Corning under the mark Microsheet. The assembly 20 is secured to the rear window 211 by a layer of appropriate optical adhesive 12, with the volume hologram facing the rear window 211. The volume hologram 11A is recorded to provide, when illuminated by the illumination source 30, an appropriate image that is visible from behind the automobile over the appropriate vertical and horizontal viewing angles. By way of specific example, the hologram 11A can provide the image of a lenticular stoplight which can include a logo if desired.

The angular position A of the hologram assembly 20 relative to a horizontal axis H is measured relative to the plane tangent at the center of the hologram assembly 20. The central axis of the illumination source 30 is at an angle B relative to the horizontal axis H and preferably passes through the center of the hologram assembly 20.

It should be appreciated that the angles A and B will depend on the particular automobile in which the stoplight assembly is installed, and will determine the angular relationships of the reference and object beams used for recording the volume hologram 11A of the hologram assembly 20. By way of an illustrative example which will also be discussed further herein relative to recording, the angle A of the hologram assembly 20 relative to the horizontal axis H could be about 53 degrees, and the angle B of the illumination source central axis relative to the horizontal axis H could be about 21 degrees.

The illumination source 30 includes an incandescent lamp 15 such as a quartz halogen bulb, a parabolic reflector 17 that generally confines the illumination to the hologram assembly 20, and a high pass filter 19 having a cutoff wavelength of about 600 nanometers (nm). As a result of the spectral characteristics of human vision, the image provided by the will be perceived as red, with the apparent peak intensity being somewhere between about 600 and 620 nm. The incandescent lamp 15 is connected to the brake light actuating circuit of the automobile so as to be energized when the brake pedal is depressed.

Figure 3A:
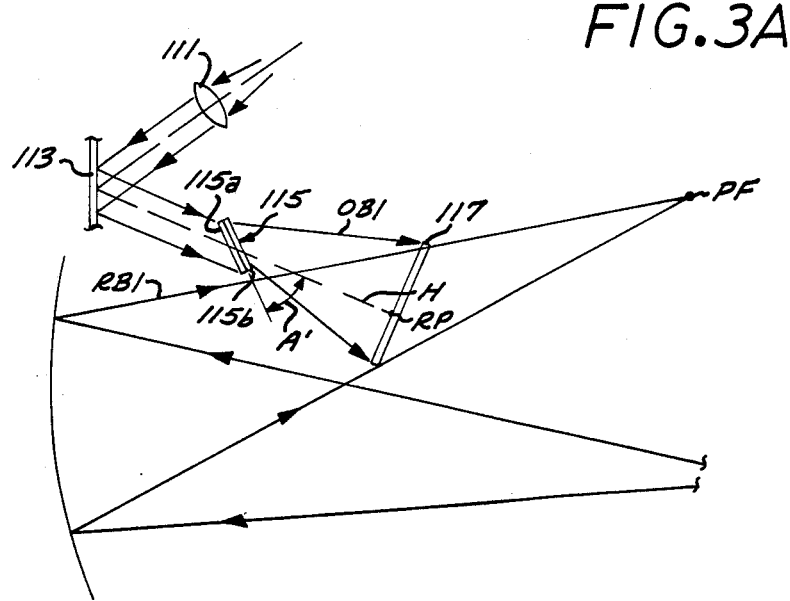
FIGS. 3A and 3B schematically show by way of illustrative example a process for recording the volume hologram of the hologram assembly of FIG. 2.
Figure 3B:
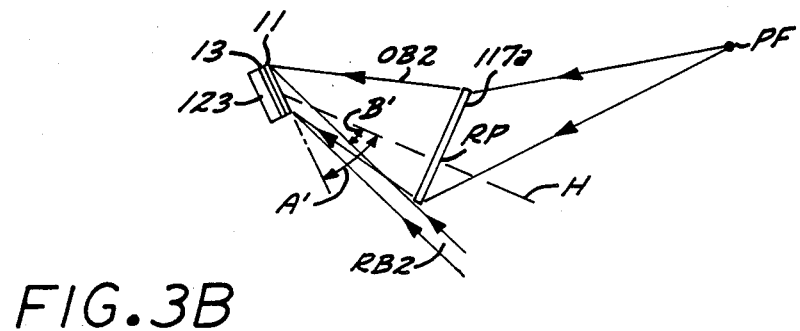

FIGS. 3A and 3B are top plan views illustrating a two step process for recording the volume hologram 11A. As will be readily apparent from the following, the resulting volume hologram made pursuant to the process would be appropriately rotated 90 degrees for installation.

Referring specifically to FIG. 3A, the first step in recording the volume hologram 11A generally involves recording the image of a lenticular lens array in a first hologram, which can comprise a silver halide hologram for example. The illumination for a reference beam RB1 and an object beam OB1 are provided pursuant to known techniques, for example by a laser output of long coherence length which is P-polarized (i.e., polarized parallel to the plane of FIG. 3A) and then divided by a beam splitter (not shown) so as to provide at the silver halide film an object beam that is approximately ⅛ the intensity of the reference beam. The laser output is P-polarized to reduce reflectivity off the back (non-incident) surface of the recording film. Such reflectivity, if not controlled, would cause unwanted reflection holograms to be formed. Each of the split beams is optically controlled to be a diverging beam, which for example can be achieved by a microscope objective lens and an iris.

Preferably, the optical path lengths for the respective illumination that produces the object beam OB1 and the reference beam RB1 are made substantially equal, which can be accomplished pursuant to known techniques including the use of appropriate lenses and/or relay mirrors.

The diverging beam for the object beam OB1 is collimated by a collimating lens 111. The collimated output of the collimating lens 111 is reflected by a relay mirror 113 to a lenticular lens array 115, which provides the object beam to a sheet of silver halide film 117.

The centerline of the collimated beam incident on the lenticular lens array 115 corresponds to the horizontal axis H discussed above relative to the automobile installation discussed above, and will be designated HH for ease of explanation. The center of the lenticular lens array 115 is on the axis HH which intersects the silver halide film 117 at a reference point RP. The reference point RP is slightly off center in one direction so as to provide for the volume hologram 11A a vertical viewing angle that is greater above the axis H than below (i.e., the larger portion corresponds to the portion of the volume hologram 11A that will be above the axis H). The silver halide film sheet 117 is close to being normal to the axis HH.

The lenticular lens array 115 is tilted relative to the axis HH at an angle A' which is determined by (a) the angle A in FIG. 1, (b) the wavelength of the recording illumination, (c) the wavelength of greatest perceived intensity of the playback illumination provided by the illumination source 30 of FIG. 1, and the processing characteristics of the recording medium for the volume hologram 11A. Thus, if the recording medium does not shrink or swell as a result of processing, then the angle A' (FIG. 3A) could be determined by use of the grating equation since wavelengths and the angle A are known. However, for the illustrative example of a dichromated gelatin volume hologram 11A, dichromated gelatin swells when processed and the angle A' is determined empirically, with the grating equation as a good starting point. For the specific example discussed above where A is about 53 degrees and the illumination peak intensity wavelength is about 610 nm, the angle A' is about 41 degrees for a recording illumination of 514.5 nm which is an appropriate wavelength of dichromated gelatin holograms. The value of about 41 degrees is close to the angle of 42.3 degrees which is the result of using the grating equation. It should be appreciated that for a recording medium that swells, DCG for example, the actual angle will be slightly less than calculated pursuant to the grating equation.

The lenticular lens array 115 includes first and second cylindrical lens arrays 115a, 115b having different spread angles about respective spread axes that are orthogonal to each other. The first cylindrical lens array 115a receives the collimated illumination, and includes a plurality of parallel cylindrical lenses which are parallel to the plane of FIG. 3A, and in edge view as oriented in FIG. 3A would show the edge of the array that is parallel to the longitudinal axes of the lenses. The second cylindrical lens array 115b receives the output of the first cylindrical lens array 115a, and includes a plurality of parallel cylindrical lenses which are orthogonal to the plane of FIG. 3A, and in edge view as oriented in FIG. 3A would show the ends of the lenses. Stated another way, the longitudinal axes of the lenses of the second cylindrical lens array are at the right angles to the longitudinal axes of the lenses of the first cylindrical lens array. The first cylindrical lens array provides a total spread of about 100 degrees, while the second cylindrical lens array 115b provides a total spread of about 20 degrees. By way of specific example, the cylindrical lenses of the arrays 115a, 115b are concave.

The diverging beam illumination for the reference beam RB1 is focused to form the converging reference beam RB1 by a spherical mirror 119, for example. The converging reference beam RB1 has a point focus PF at a location that is beyond the silver halide film sheet 117.

After exposure, the silver halide film 117 is developed to produce a silver halide hologram 117A which is utilized in the next step of the recording process illustrated in FIG. 3B.

Referring specifically to FIG. 3B, a dichromated gelatin (DCG) film 11 is exposed to a collimated reference beam RB2 and an object beam OB2 that comprises diffracted illumination provided by the silver halide hologram 117A in response to a diverging beam. The illumination utilized to produce the reference beam RB2 and the object beam OB2 can be conveniently provided by the same laser source that provided the beams in the first step of FIG. 3A, and also preferably have substantially the same optical path lengths to the DCG film 11. At the DCG film 11, the object beam is approximately ⅛ the intensity of the reference beam.

The dichromated gelatin film 11 is appropriately adhered to the thin glass substrate 13, which in turn is adhered to a thick glass substrate 123. Preferably the non-incident side of the thick glass substrate 123 (i.e., the side opposite the side supporting the thin glass substrate 13) is painted matte black so as to reduce noise from reflections.

The relative positioning of the silver halide hologram 117A and the DCG film 11 is substantially identical to the relative positioning of the silver halide film 117 and the lenticular lens array 115 in FIG. 3A. Thus, the DCG film 11 is in substantially the same position as the lenticular lens array 115 and is at the angle A' relative to the axis HH between the center of the DCG film 11 and the reference point RP on the silver halide hologram 117A.

The diverging beam that illuminates the silver halide hologram 117A originates from the point focus PF defined by the reference beam RB1 in FIG. 3A, and is essentially the reverse of the reference beam RB1 used in recording the silver halide hologram 117A.

The collimated reference beam RB2 is at an angle B' relative to the axis HH, where the angle B' is substantially the same as the illumination angle B in FIG. 1. For the above described illustrative example, the angle B' would be about 21 degrees relative to the axis HH.

After exposure, the DCG film 11 is developed pursuant to known processes to form the volume hologram 11A. The laminar hologram assembly 20 comprising the thin glass substrate 13 and the DCG volume hologram 11A is then delaminated from the thick glass substrate 123 and appropriately adhered to the inside of an automobile rear window, with the DCG volume hologram 11A adjacent to the rear window.

The illustrative example of recording the volume hologram 11A essentially involves (a) recording the image of a lenticular lens array, and then (b) recording the playback of the recorded lenticular lens array.

Although the foregoing steps for forming the volume hologram 11A utilizes a converging reference beam in the recording of the first hologram (silver halide by way of example), and thus a diverging beam for playback thereof, collimated illumination could be utilized with the appropriate optics.

Figure 4:
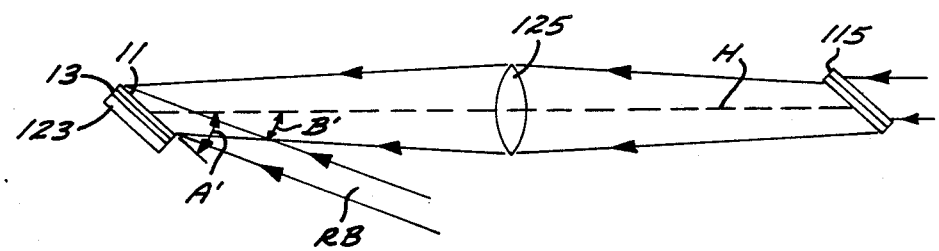
FIG. 4 schematically shows a further example of a process for recording the volume hologram of the hologram assembly of FIG. 2.

It should be appreciated that the volume hologram 11A can be recording in a one step procedure, as for example schematically illustrated in FIG. 4. For producing the reference object beam OB, collimated illumination is provided to the lenticular lens array 115 which is centered on the centerline of the incident collimated illumination. The centerline of the collimated illumination for the object beam OB corresponds to the horizontal axis H in FIG. 1 and is labelled HH as in FIG. 3A. A large imaging lens 125 images the object beam from the lenticular lens array 115 onto the DCG film 11 which is tilted at the angle A' relative to the axis HH. The lenticular lens array 115 is also tilted relative to the axis HH at an angle that produces an image that is substantially coplanar with the DCG film 11.

The collimated reference beam RB is incident on the DCG film at angle B' relative to the axis HH as described above relative to FIG. 3B.

As a further recording alternative, a master volume hologram is made pursuant to the two-step process illustrated in FIGS. 3A and 3B, which is then placed parallel to and slightly spaced from the DCG film 11. Exposure is achieved by illuminating the master volume hologram with collimated illumination that is oriented relative to the master hologram substantially the same as the illumination source 30 of FIG. 1 is oriented relative to the volume hologram 11A of the hologram assembly 20. The diffracted illumination would be the object beam, while the non-diffracted illumination would be the reference beam. The 8 to 1 reference beam to object beam ratio is achieved by making the master volume hologram 12% efficient.

Although the volume hologram 11A has been specified as a dichromated gelatin hologram, it should be appreciated that other recording media could be utilized, such as n-polyvinyl carbazole which may provide for a better volume hologram. Similarly, other recording media could be utilized instead of silver halide in the formation of the first hologram in the two step process.

While the foregoing holographic stoplight system provides a lenticular lens array image, it should be appreciated that other images are readily provided, such as a diffusing screen image that can be achieved by storing the image of a high gain ground glass diffusing screen, for example. Also, a three-dimensional image such as the word STOP could be provided, possibly with the automobile logo or symbol. The volume hologram could be shaped as desired, for example, octagonal or in the form of an emblem. Multiple light sources that are on at different times could be utilized to illuminate different portions of the volume hologram to provide a time varying pattern. Also, different light sources with different filters could produce images of different colors, for example, amber when gas pedal is released and red when the brake pedal is depressed. The volume hologram recording medium could be subjected to multiple exposures at different angles, which would increase angular coverage. As another modification, more complex lenticular patterns could be utilized, as utilized in conventional stoplights. It should also be appreciated that the illumination source can be mounted at a location that is below the volume hologram out of the driver's rearward field of vision.

The foregoing has been a disclosure of a holographic stoplight assembly which does not interfere with the driver's rearward vision, and allows for optimum compliance with Federal regulations regarding the location and angular coverage of the stoplight. Since the illumination source is conveniently located inside the automobile and since the hologram assembly is thin and substantially transparent to the driver, significant limitations are not imposed on the design of the automobile. Moreover, the stoplight assembly is amenable to mass production techniques and is readily adapted to different automobiles.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic automobile stoplight system comprising:
   a hologram having a recorded image of an automobile stoplight secured adjacent to an automobile rear window; and
   illumination means located out of the driver's rearward field of view and forward of said hologram for illuminating said hologram which produces in response to the illumination a holographic image of said recorded image that is visible from behind the automobile.

2. The holographic automobile stoplight system of claim 1 wherein said hologram comprises a volume transmission hologram.

3. The holographic automobile stoplight system of claim 2 wherein said volume hologram comprises dichromated gelatin.

4. The holographic automobile stoplight system of claim 2 wherein said volume hologram comprises n-polyvinyl carbazole.

5. The holographic automobile stoplight system of claim 1 wherein said recorded image comprises a lenticular lens array.

* * * * *